UNITED STATES PATENT OFFICE.

HENRY M. RUSSELL, OF WHEELING, WEST VIRGINIA.

CHANGING-VIEW DISPLAY APPARATUS.

1,423,262. Specification of Letters Patent. Patented July 18, 1922.

Application filed May 12, 1921. Serial No. 468,956.

*To all whom it may concern:*

Be it known that I, HENRY M. RUSSELL, a citizen of the United States, residing in the city of Wheeling, in the county of Ohio and State of West Virginia, have invented a new and useful Changing-View Display Apparatus, of which the following is a specification.

My invention relates to improvements in that class of display apparatus in which the subject displayed appears to change as the apparatus is viewed from different positions, and in which, if the different views of the subject are suitably selected and arranged, and the observer travels past the apparatus at a suitable speed, the subject will appear to execute some evolution involving the motion, appearance or disappearance of some part or parts, or all of the subject, or change in shade or color, or both, or involving both motion and change in shade or color. For brevity, I refer to this class of apparatus as a changing-view apparatus to include both the rapid change from one to another of the successive steps of evolution whereby the eye receives the impression of actual movement, and also to include a slower change, not fast enough to give the impression of actual movement on the part of the subject, and also to include the complete change from one subject to another.

One object of my invention is to provide a changing-view display apparatus which shall show a number of different views, each view being complete, and being illuminated throughout the entire field. Another object of my invention is to provide a changing-view display apparatus which will show images of an actual object in its true form and color, and which may also be used to display pictures of an object. Another object of my invention is to provide an apparatus that is simple, cheap to construct, and requires no special illumination. Another object of my invention is to provide an apparatus that is compact. Another object is to provide a device in which the desired results may be obtained without the use of mirrors, thereby avoiding imperfections due to the thickness of the glass of which a mirror is constructed. Another object is to provide a device in which all of the illumination may come from substantially the same direction.

Figure 1:
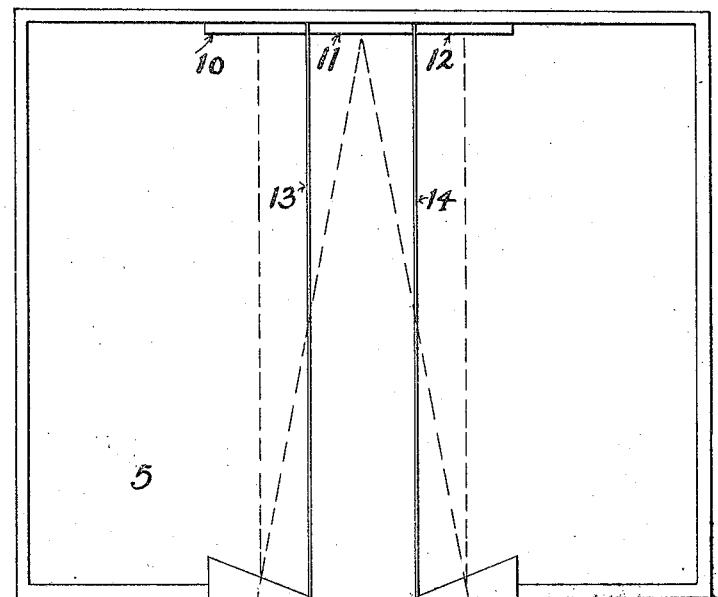
Figure 2:
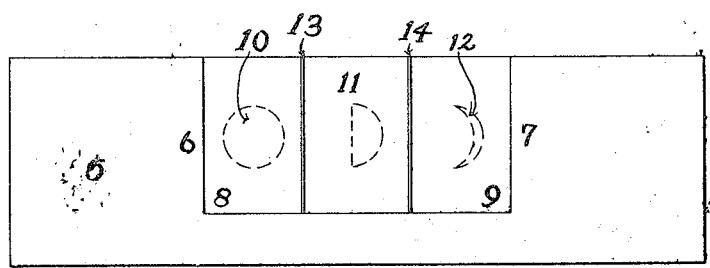
Figure 3:
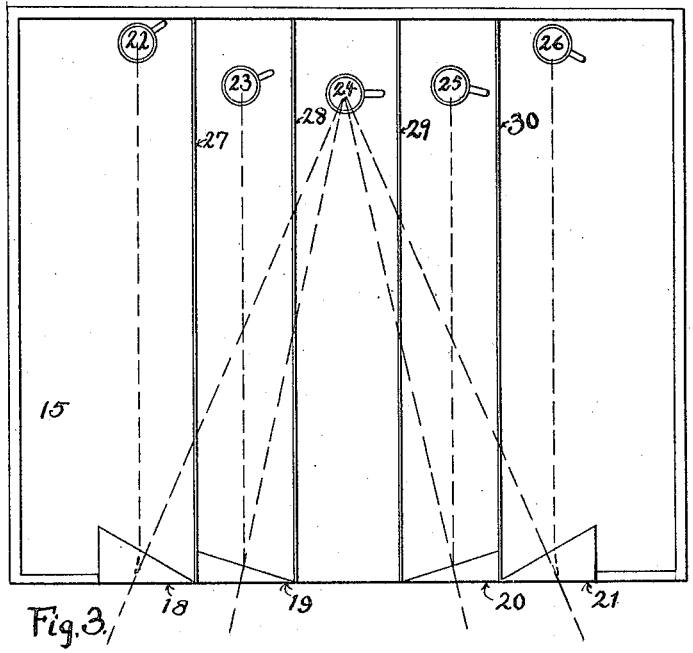
Figure 4:
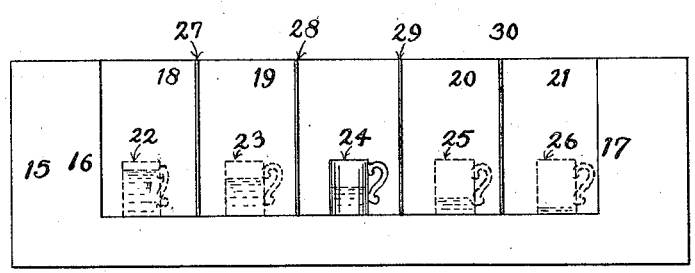

I attain these objects by apparatus, preferred forms of which are shown in the accompanying drawings, in which Fig. 1 is a plan view of one form of the apparatus, and Fig. 2 is a front view of the same form; Fig. 3 is a plan view of another preferred form of the apparatus, and Fig. 4 is a front view of this second form. Similar numbers refer to similar parts throughout the several views.

Referring now to Figs. 1 and 2, 5 is a rectangular box with an opening extending from 6 to 7 in its front. 8 and 9 are prisms of transparent material placed at the sides of this opening so as to leave a space between them. 10, 11 and 12 are pictures representing an object in different stages of an evolution—in this case, the moon shown full in 10, half full in 11, and slightly less than quarter full in 12. 13 and 14 are screens, the function of which will be explained later. The prisms 8 and 9 are made of a material having such a refractive index, and having such an angle, that a ray of light passing from the center of picture 10, through prism 8, will emerge along a line, which, if produced, would pass through the center of picture 11. Likewise, prism 9 will refract a ray of light from the center of picture 12 along a line, which, if produced, would pass through the center of picture 11. The screens 13 and 14 are to prevent the observation of any picture save 10 through prism 8 and to prevent the observation of any picture save 11 through the opening between prisms 8 and 9, and to prevent the observation of any picture save 12 through prism 9. The operation of this form of the apparatus is as follows: When an observer walks past the front of the apparatus, he will first see picture 10 through prism 8, but picture 10 will appear to occupy the location actually occupied by picture 11. As he advances toward the right, the edge of picture 10 will disappear, but the corresponding edge of picture 11 will take its place, and the observer will still apparently see a complete picture. When he gets to a point where just half of picture 11 is visible, he will see what appears to be a complete picture, but in reality, half of it will be picture 11 and the other half will be picture 10. The change will continue in this way until he sees the whole of picture 11, and then picture 12 will be substituted for it in the same way. The effect produced is that of the object represented by the pictures changing from one condition to another.

In this form, the pictures are, for convenience, placed in the same plane. They will not, therefore, appear exactly in the same plane, but as the surfaces of the pictures are flat, the error may be neglected, where, as in this case, the angle of refraction is not very great.

Turning now to Figs. 3 and 4, which show respectively a top view and a front view of another preferred form of the apparatus, the numeral 15 refers to a rectangular box which has an opening in its front extending from 16 to 17. 18, 19, 20 and 21 respectively, are prisms. 22, 23, 24, 25 and 26 respectively are different objects, alike as to some of their parts, but different as to other parts, so as to show the successive stages of an evolution. 27, 28, 29 and 30 are screens to prevent any one of the objects from being seen through more than one prism, and to prevent the object 24 from being seen except through the space between the prisms 19 and 20. The objects in this case are glass cups. Cup 22 is full of water; 23 has a little less water in it; 24 is half full; 25 a little less than half full; and 26 is less than quarter full. The angles of the respective prisms and their refractive indices are such that prism 18 will refract a ray of light coming from the center of cup 22 through such an angle that the ray of light that emerges from the prism 18 will be traveling in a line, which, if produced, would pass through cup 24. Cup 22 is placed the same distance from the center of prism 18 that cup 24 is from the middle point of the front of the box 15, and the handle of cup 22 is turned back through an angle equal to the angle made by lines passing respectively from cup 22 and cup 24 to the center of prism 18. Cup 23 is similarly placed with respect to prism 19, and its handle is turned back through an angle equal to the angle at which lines drawn from the center of cup 23 and the center of cup 24 would intersect at the center of prism 19. Cups 25 and 26 are similarly placed with respect to prisms 20 and 21, and the angles and refractive indices of prisms 20 and 21 bear the same relations respectively to the location of cup 25 with respect to cup 24, and the location of cup 26 with respect to cup 24, that the angles and refractive indices of prisms 19 and 18 bear respectively to the location of cup 23 with respect to cup 24, and the location of cup 22 with respect to cup 24.

The operation of this form of the device is substantially similar to that of the preceding form. As an observer walks in front of the device, from left to right, he will first see cup 22, which is full of water. As he proceeds, a portion of the handle of 22 will disappear, but its place will be taken by the corresponding portion of the handle of cup 23. As he proceeds farther, a part of the body portion of cup 22 will disappear, and will be replaced by the corresponding part of the body portion of cup 23. During all this time the cup will appear as a single cup, but the surface of the liquid will appear to have an off-set in it. As the observer proceeds further, cup 22 will entirely disappear, and cup 23 will take its place. Cup 23 will be succeeded by cup 24; cup 24 will in turn be succeeded by cup 25; and cup 25 will finally be succeeded by cup 26. If the observer passes rapidly, the effect will be that the level of the liquid will appear to move downward as though the cup were emptying itself. If the observer walks from right to left of the apparatus, the cup will appear to fill itself.

When the angle of a prism is referred to in the following claims, it will be understood that a prism having its thin edge to the right so as to refract the light to the left, will be considered as having a positive angle, and a prism having its thin edge turned toward the left so as to refract light to the right, will be considered as having a negative angle, and, therefore, an angle different from that of the first mentioned prism, even though the actual angle between the two faces of the respective prisms may be the same.

I claim:

1. In a changing-view display apparatus, the combination of two views and a prism, all so located with respect to each other, that the apparent position of one of the said views, as observed through the prism, shall be the same as the actual position of the other of the said views, and screens to prevent the observation of one of the said views except through the said prism, and to prevent the observation of the other of the said views through the said prism.

2. In a changing-view display apparatus, the combination of two views and two prisms, all so located with respect to each other, that the image of one of the said views, as observed through one of the said prisms, shall occupy the same apparent location as that occupied by the image of the other of the said views as observed through the other of the said prisms.

3. In a changing-view display apparatus, the combination of two views and two prisms, all so located with respect to each other, that the image of one of the said views, as observed through one of the said prisms, shall occupy the same apparent location as that occupied by the image of the other of the said views as observed through the other of the said prisms, and screens to prevent the observation of either of the said views through more than one of the said prisms.

4. In a changing-view display apparatus, the combination of a plurality of views and a plurality of prisms, the said prisms being of such angles and the said views and prisms being so located with respect to each other that the apparent location of one of the said views, as observed through one of the said prisms, shall be the same as the apparent location of any other of the said views as observed through some other prism.

5. In a changing-view display apparatus, the combination of two objects, identical as to some of their parts, and two prisms, the two objects and the two prisms being so located with respect to each other that when portions of the images of both said objects are visible simultaneously through the said prisms, the portions of the two said images representing different portions of identical parts of the said objects shall register and form substantially a single image of the identical parts of the said objects.

6. In a changing-view display apparatus, the combination of two objects identical as to some of their parts, and a prism, the said objects and the said prism being so placed that when a portion of one of the said objects is directly visible, and a portion of the image of the other of said objects is simultaneously visible through the prism, the said visible portion of the one of said objects in part directly visible shall register as to the identical parts of the said object with the visible portion of the image of the other of said objects, so that so far as the identical portions of the said objects are concerned, it will appear as a single object.

7. In a changing-view display apparatus, the combination of a plurality of views and a plurality of prisms, the said prisms being of such angles and the said views and prisms being so located with respect to each other that the apparent location of one of the said views, as observed through one of the said prisms, shall be the same as the apparent location of any other of the said views as observed through some other prism, and screens to prevent the observation of any one of the said views through any save one of the said prisms.

HENRY M. RUSSELL.